F. W. WILD.
Improvement in Balance-Wheels.
No. 114,240. Patented April 25, 1871.
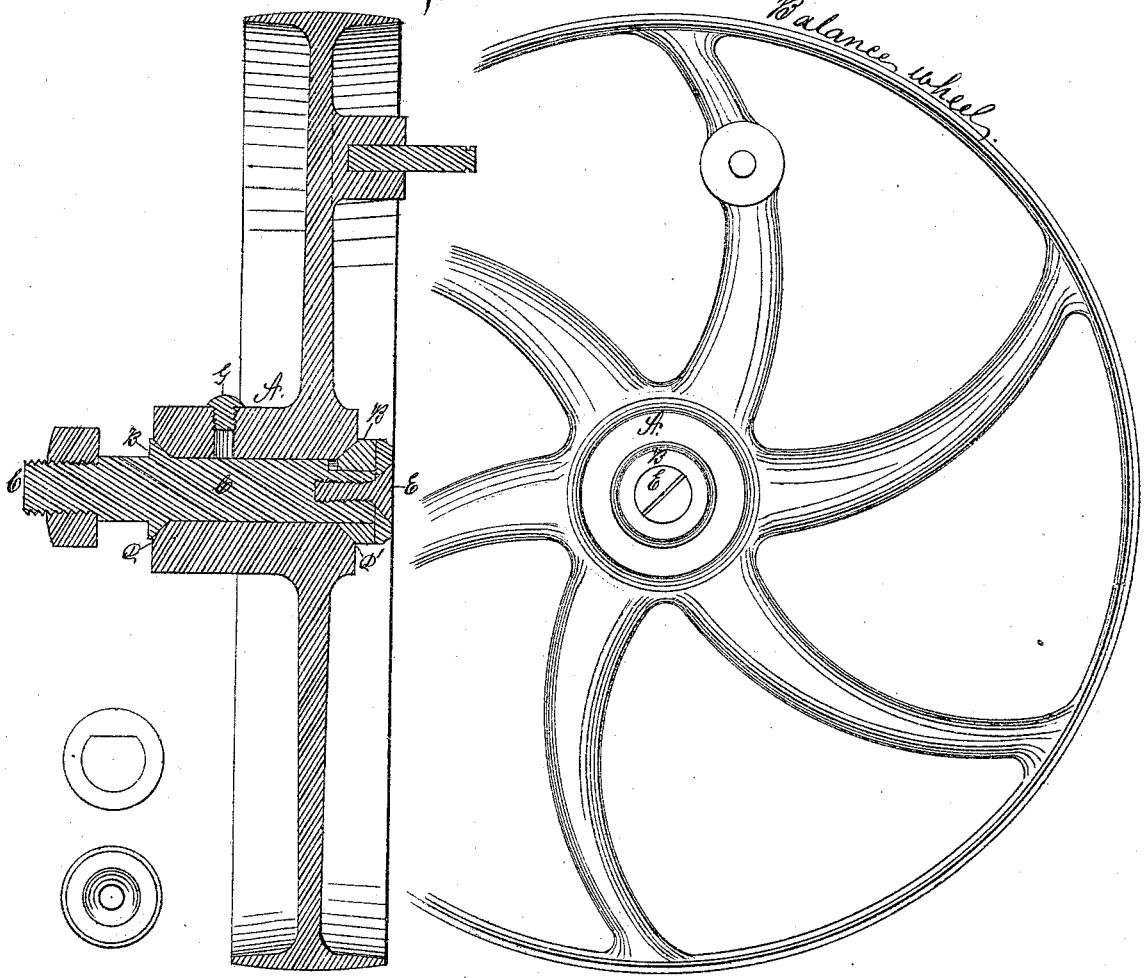
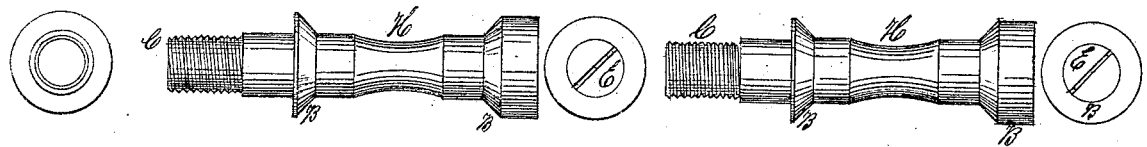
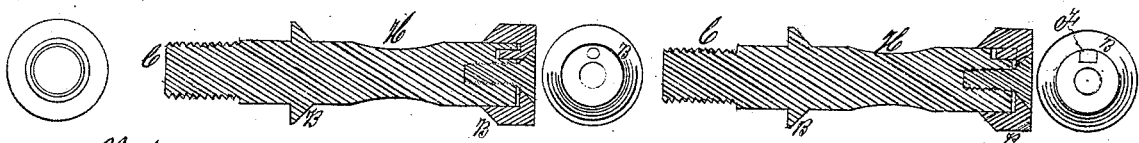

UNITED STATES PATENT OFFICE.

FREDERICK W. WILD, OF BALTIMORE, MARYLAND.

IMPROVEMENT IN BALANCE-WHEELS.

Specification forming part of Letters Patent No. 114,240, dated April 25, 1871.

*To all whom it may concern:*

Be it known that I, FRED. W. WILD, of Baltimore, Maryland, have invented a new and useful Improvement in Balance-Wheels, which is especially adapted to sewing-machines; and I do hereby declare that the following is a full and exact description of the construction and operation of the same, reference being had to the annexed drawings, forming part hereof.

In the present practice the use of sewing-machines wears the hub of the fly-wheel and the pin on which it revolves irregularly, and this causes the wheel to wabble and jerk, resulting in unequal motion, concussion, and noise, as well as involving frequent and expensive repairs.

The object of my said invention is to avoid these objections and difficulties, and to prevent the oil which lubricates the hub and pin from wasting, and thereby come in contact with the wheel and belt which it propels.

To accomplish this I form the hub of the fly-wheel A with two conical recesses, one at each end, B B. The pin C is constructed with two male cones, D D', one being solid on the pin, and the other adjustable by means of the adjusting-screw E. The adjustable cone is prevented revolving on the pin by the key F, or any equivalent device. Thus it will be seen that when by wear the least loss-motion is apparent, the adjusting-screw E can be forced in a little, and until the fly-wheel moves again smoothly. By this construction of the hub and pin the oil will not leak out, but will be present for lubricating the hub and pin only. The hub is constructed with an oil-hole and a thumb-screw, G, which screw is fitted so as to prevent the oil being exhausted from the hub and pin by centrifugal force.

Exhibit A' shows the pin hollowed out at H, for the purpose of giving more room for oil, if in practice found necessary. And the end sought by said invention is to render the sewing-machine less liable to get out of repair, less expensive to keep in good order, more harmonious in its action, less noisy, and more agreeable when in use.

Having thus described my invention, what I claim therein as new, and desire to secure by Letters Patent, is—

1. The construction of the pin C, with its adjustable device E, with reference to the hub A of the balance-wheel, substantially as herein set forth.

2. The construction of the adjustable cone B, with its adjusting-screw E, when combined with the pin C, as herein described.

3. The construction of the pin C, with its adjustable cone B, adjusting-screw E, all arranged with reference to and for operation with the balance-wheels of sewing-machines, substantially as herein described.

FREDERICK W. WILD.

Witnesses:
HENRY C. WILD,
CHARLES A. PFEIFFER.